Figure 1:
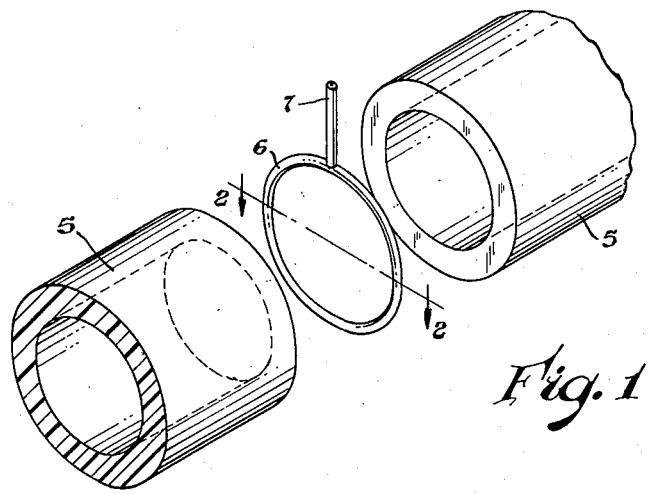

Nov. 22, 1960     F. J. LOWES     2,961,363

COUPLING METHOD FOR THERMOPLASTIC COMPONENTS

Filed March 27, 1956

INVENTOR.
Fred J. Lowes

BY

*Griswold & Burdick*
ATTORNEYS

United States Patent Office 2,961,363
Patented Nov. 22, 1960

2,961,363

COUPLING METHOD FOR THERMOPLASTIC COMPONENTS

Fred J. Lowes, Midland, Mich., assignor to The Dow Chemical Company, Midland, Mich., a corporation of Delaware Filed Mar. 27, 1956, Ser. No. 574,274

7 Claims. (Cl. 154—116)

In addition to a wide assortment of component, joinable articles, pipe or tubing and the various connecting fittings for accommodating its fabrication may advantageously be comprised of various thermoplastic resinous materials including, for example, polyethylene, chlorinated polyethylene, thermoplastified polyvinylchloride and like or similar plastic materials of construction. As an illustration, many types of piping systems for a wide variety of services may frequently be installed more expediently and economically when they are fabricated from plastic piping materials in place of metal pipe or tubing.

Difficulty, however, has been encountered in simply and effectively joining many component thermoplastic articles, particularly pipe and fittings, to achieve suitable installations. By way of convenient illustration with piping components, the use of screw fittings and clamping arrangements has not always provided satisfactory results. It is not uncommon, when such manner of coupling is utilized, to experience leaks and failures which may be the result of an improper initial engagement or fit between coupled lengths of pipe or a pipe and connecting fitting or that may subsequently be caused by "creep" or plastic distortion and deformation under load in the thermoplastic material or due to the relatively flexible character of the thermoplastic. In addition, it is an expensive and sometimes inconvenient and cumbersome requirement to provide threads on plastic pipe in the manner of iron pipe fabricating practice or to employ clamps and clamping devices (which usually are of the clampable insert type of arrangement) for joining lengths of plastic pipe.

Furthermore, conventional welding procedures are not especially adapted for meeting the requirements that are involved in fabricating plastic pipe. Also the use of adhesives or solvents for making plastic pipe joints is often hindered by a necessity for practicing highly specialized fabricating techniques and procedures and complicated by the fact that a considerable setting time may be needed before the joined piping may be effectively bonded together. Besides this, it may oftentimes be difficult or impossible to find suitable adhesive or solvent substances for many thermoplastic resinous materials and there is always some uncertainty whether an adhesive joint is possessed of the same inertness to all materials as that of the plastic pipe. Analogous annotation may also be applied to other component, joinable plastic articles with the further comment that many noncylindrical articles are not well adapted to being threaded.

In would be advantageous for a method to be available for joining plastic pipe and fittings and other component plastic articles with secure and dependable fastening in a quick, simple and expeditious manner which did not necessitate the employment of relatively expensive and specialized apparatus for the purpose and that did not entail reliance on particularly high or unusual degrees of skill for its accomplishment. It would also be advantageous if such a method could preclude the difficulties of joining plastic pipe and the like according to conventional fabricating techniques.

To the realization of these and related ends, this invention has reference to, and has as among its principal objectives, the provision of an improved and superior method for joining pipe, fittings and the like piping components and other similar or analogous joinable, component articles of thermoplastic resinous material.

In accordance with the present invention, pipe and fittings and other component articles of thermoplastic resinous material may be easily and efficiently joined by a method which comprises providing between and within the engaging surface portions of plastic piping or other components that are in contiguous relationship in coupled combination a hollow element containing an exothermic, auto-combustible substance, said hollow element conforming generally to the engaging configurations of said piping or other components and preferably having an accessible integral lead containing said exothermic substance extending out from between said engaging surface portions; igniting said exothermic substance in said element, as through said lead, to generate sufficient heat to fuse the thermoplastic material adjacent to said element on the adjoining surfaces of said piping or other components; interfusing a corresponding portion of the thermoplastic material on the adjoining surfaces of said piping or other components by heat from said ignited exothermic substance; and welding said piping or other components together by cooling the interfused portion of the thermoplastic material in said adjoined components.

The method of the invention is particularly adapted to make piping connections with lap or butt type joints or to join other components of thermoplastic resinous material in an analogous manner. Advantageously, the hollow element, which for piping may advantageously be in the form of a hollow annular ring, is comprised of metal in order to provide a container envelope for the exothermic substance that has great heat transmitting capacity. It is frequently beneficial to provide the hollow element in accommodating grooves or recesses in one or both of the adjoined engaging end or wall surfaces of the piping or other components to be welded together. It is preferable to position the element about centrally between the adjoining surfaces whether lap or butt joints are being made.

Nitroguanidine and like substances which do not require air or other extraneous comburents for combustion and which are highly exothermic self-burning materials may be utilized with particular advantage as the auto-combustible exothermic substance in the practice of the invention. It is usually desirable for the auto-combustible material to be a solid in powder form. Mixtures of materials may be employed provided they interreact in the manner of an auto-combustible, exothermic substance. In many cases other materials that are frequently employed as or in combination with explosives may be suitably utilized as an auto-combustible exothermic substance in the practice of the invention. Included in this category are various fuse powders, gunpowders of either the black or smokeless variety, trinitroglycerine on diatomaceous earth, cordite and the like.

The amount of the exothermic substance to be employed, as will be apparent to those skilled in the art, depends upon its heat of self-reaction or burning and the fusion temperature and mass or quantity of the thermoplastic material involved. The exothermic substance should be firmly packed in a uniform cross-sectional manner in the hollow element which may have a circular or other desired cross section. Care should be taken to avoid using excessive quantities of the exothermic substance which may cause overheating and excessive melting or burning of the plastic. It is merely necessary when joining piping, for example, to fuse a ring or looping band of plastic material together on the adjoined wall or end surfaces of the piping or an analogous portion on other components in order to effect a sound joint. In certain instances for cylindrical articles such as piping and the like, it may be advantageous to employ a continuous multiple hollow ring arrangement for containing the exothermic substance. Thus, for butt joints, a ring in the general form of an Archimedean spiral may be employed. For lap joints, a closely spaced coil or helical variety of ring may be utilized. In other cases where polygonal, irregularly shaped, non-enclosed or flat components are to be joined, the exothermic substance may be placed in a suitable container shaped to conform to the surfaces to be joined.

Figure 3:
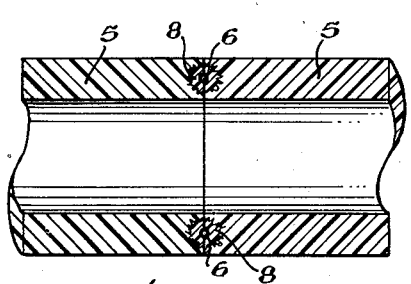
Figure 2:
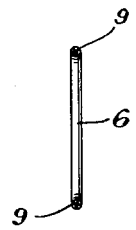
Figure 4:
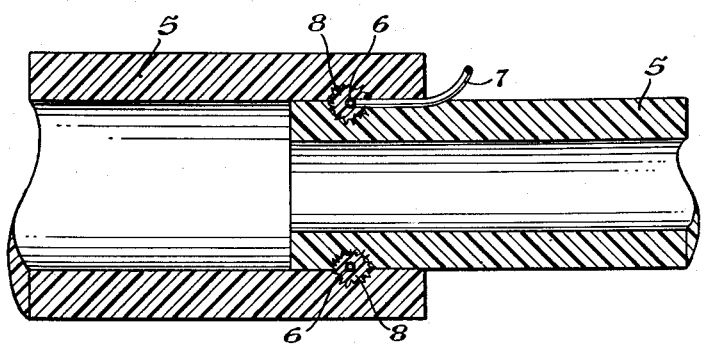

Further features and advantages of the invention are apparent in the accompanying drawing, having particular reference to piping components, wherein:

Figure 1, in perspective, shows the general relationship between the hollow annular ring element and piping components forming a butt joint;

Figure 2, is a cross-sectional view of the hollow ring taken along the line 2—2 in Figure 1;

Figure 3, in fragmentary cross-section, schematically illustrates a finished butt joint made in accordance with the invention; and Figure 4, in fragmentary cross-section, depicts a finished lap joint.

In Figure 1, the piping components 5 are shown preparatory to providing the hollow annular ring 6 containing the exothermic auto-combustible substance between their abutting, engaging end surface portions which are to be welded together to form a tightly sealed coupling. As is apparent, the ring 6 conforms to the engaging configuration of the piping components so as to fit about centrally, in a concentric manner, between the ends of the piping components. The extending lead 7 is shown provided on the ring to facilitate igniting the exothermic substance when the components are joined about the ring in welding position. As indicated, the lead 7 is hollow and open-ended and is filled with the particular auto-combustible exothermic substance employed for filling the ring 6.

Figure 2 shows the exothermic, auto-combustible substance 9 contained in the hollow, enveloping ring 6. A finished butt joint is illustrated between the piping components 5 in Figure 3 and a lap joint between the overlapping components in Figure 4. Such joints are capable of withstanding considerable hydraulic and pneumatic pressures and generally are about equivalent in this regard to the bursting strength of the piping components. The area 8 designated about the ring 6 in both Figures 3 and 4 represents the looping band of interfused thermoplastic material adjacent the ring on the adjoining surfaces of the components which monolithically welds the components together. As shown, the ring 6 remains embedded in the joint after the connection has been made.

Any type of thermoplastic pipe or pipe and fitting including elbows, T's, couplings, valves and the like having butt or male or female lap connecting ends can readily be joined by the method of the invention. Besides eliminating the necessity for using screw fittings and threading pipe or employing exposed clamps and the like, practice of the present invention may often facilitate the fabrication of piping systems in a manner which is permissive of making test or tentative assembly arrangements before permanently joining the components. In addition, it obtains smoother internal joints in piping connections than can usually be accomplished when screwed or clamped installations are utilized. Furthermore, it provides a simplified and more practical technique for installing and coupling plastic piping systems in areas or locations having limited accessibility or working space. For example, in overhead systems or in sub-grade and underground locations where the pipe may be in a narrow trench or channel, it is possible to join the piping components with a minimum of auxiliary apparatus and equipment and without a fine degree of care or skill being required for satisfactory results.

In addition, as indicated, other plastic articles and objects besides piping components, including such items as water meter casings, fuse boxes and the like, may be effectively joined by practice of the present invention regardless of their cross-sectional configuration, including polygonal, incompletely enclosed and flat forms.

What is claimed is:

1. Method for joining components of thermoplastic resinous material which comprises providing between and within the engaging surface portions of said plastic components that are in contiguous relationship in coupled combination a hollow element containing an exothermic, auto-combustible substance, said hollow element conforming generally to the engaging configurations of said components; igniting said exothermic substance in said element to generate sufficient heat to fuse the thermoplastic material adjacent to said element on the adjoining surfaces of said components; interfusing a corresponding portion of the thermoplastic material on the adjoining surfaces of said components by heat from said ignited exothermic substance; and welding said components together by cooling the interfused portion of the thermoplastic material in said adjoined components.

2. The method of claim 1 wherein said components are adapted to be joined by butt joints.

3. The method of claim 1 wherein said components are adapted to be joined by lap joints.

4. The method of claim 1 wherein said hollow element is metal.

5. The method of claim 1 wherein said components have a circular configuration.

6. The method of claim 1 wherein said components are piping components.

7. The method of claim 1 wherein said exothermic, auto-combustible substance is nitroguanidine.

References Cited in the file of this patent

UNITED STATES PATENTS

| | | |
|---|---|---|
| 1,774,505 | Deppeler | Sept. 2, 1930 |
| 2,253,364 | Cohen | Aug. 19, 1941 |
| 2,477,549 | Van Loenen | July 26, 1949 |
| 2,569,956 | Schiltknecht | Oct. 2, 1951 |
| 2,606,858 | Gillies et al. | Aug. 12, 1952 |
| 2,642,911 | De Shazor | June 23, 1953 |
| 2,667,865 | Herman | Feb. 2, 1954 |
| 2,682,461 | Hutchison | June 29, 1954 |
| 2,695,853 | Foreit | Nov. 30, 1954 |
| 2,700,011 | Taylor | Jan. 18, 1955 |

FOREIGN PATENTS

| | | |
|---|---|---|
| 26,644 | Great Britain | 1898 |
| 652,054 | Great Britain | Apr. 18, 1951 |